United States Patent [19]
Trostle

[11] 3,753,222
[45] Aug. 14, 1973

[54] THREE DIMENSIONAL COMMON DEPTH POINT EXPLORATION
[75] Inventor: Maurice E. Trostle, Houston, Tex.
[73] Assignee: Texas Instruments Incorporated, Dallas, Tex.
[22] Filed: May 22, 1970
[21] Appl. No.: 39,867

Related U.S. Application Data
[63] Continuation-in-part of Ser. No. 853,897, Aug. 28, 1969, abandoned.

[52] U.S. Cl. .................................. 340/15.5 MC
[51] Int. Cl. ............................................. G01v 1/20
[58] Field of Search ..................... 340/15.5; 181/.5

[56] References Cited
UNITED STATES PATENTS
2,792,068  5/1957  Peterson ............................ 181/.5
3,181,643  5/1965  Ehlert et al. ....................... 340/15.5
3,400,363  9/1968  Silverman ............................. 340/3

Primary Examiner—Benjamin A. Borchelt
Assistant Examiner—N. Moskowitz
Attorney—Samuel M. Mims, Jr., James O. Dixon, Andrew M. Hassell, Rene E. Grossman, Melvin Sharp and Richards, Harris and Hubbard

[57] ABSTRACT

Seismic wave detectors are located along a plurality of spaced apart parallel detecting lines. A plurality of seismic wave transmitting stations are located along a plurality of transmitting lines which are substantially perpendicular to the detecting lines at one end thereof. Seismic waves are generated from sequential ones of the transmitting lines and are received by the detectors to provide three-dimensional common depth point coverage of the earth's subsurface.

21 Claims, 5 Drawing Figures

INVENTOR
MAURICE E. TROSTLE

René E. Grossman

ATTORNEY

INVENTOR:
MAURICE E. TROSTLE

ATTORNEY

THREE DIMENSIONAL COMMON DEPTH POINT EXPLORATION

This application is a continuation in part of U.S. Pat. application Ser. No. 853,897, filed Aug. 28, 1969, now abandoned.

This invention relates to seismic exploration, and more particularly to a method and system for performing three-dimensional common depth point seismic prospecting.

The advantages provided by the commonly termed "common depth point technique" are well known. Disclosures of this technique may be found in U. S. Pat. No. 2,732,906, issued to Mayne on Jan. 31, 1956 and in U. S. Pat. No. 3,217,828, issued to Mendenhall et al. on Nov. 16, 1965. However, such previous common depth point techniques have generally only supplied information in a two-dimensional plane.

It has also been heretofore determined that a substantial amount of seismic information may be obtained by three-dimensional seismic prospecting, wherein a grid section of the earth's subsurface is sequentially mapped by conventional linear techniques. Other prospecting techniques have also been devised which utilize geophone or shot patterns for discrimination of multi-directional noise and the like, but such techniques have been limited by normal moveout, dip reflectors and have not been generally practical for continuous seismic exploration of areas of complex geology or high noise environment.

A technique for providing limited three-dimensional coverage for use with common depth point exploration is disclosed in U. S. Pat. No. 3,431,999, issued to Glazier on Mar. 11, 1969. However, this technique does not provide the necessary redundancy and resulting increase in signal-to-noise ratio required for practical three-dimensional seismic coverage of complex subsurface areas. In addition, the technique disclosed by the Glazier patent is severely limited in the area of high fold common depth point coverage and does not provide a desirable amount of relatively large angle reflections from a plurality of common depth points.

In accordance with the present invention, three-dimensional common depth point coverage is provided whereby multidirectional seismic noise may be substantially attenuated by simple seismic trace processing. With the invention, the probability of random seismic alignments being erroneously identified as legitimate reflections is substantially reduced. Improved signal-to-noise ratio is provided by the invention, as well as increase in the capability for static correction estimation. The present technique is particularly useful in providing cross and diagonal dip control for seismic events for use in migration, mapping and velocity determinations. Further, the invention provides detailed seismic information at a reasonable and practical cost for outlining complex geology such as salt domes, reefs and disturbed zones.

In accordance with the present invention, a plurality of seismic wave detectors are located along a plurality of spaced apart first parallel lines. A plurality of seismic wave transmitting stations are located along each of a plurality of second parallel lines which are substantially perpendicular to said first parallel lines. Seismic waves are sequentially initiated from the transmitting stations along sequential ones of the second parallel lines. Indications of the generated seismic waves are received by the detectors to provide three-dimensional common depth point coverage of a subsurface area.

In accordance with another aspect of the invention, a plurality of seismic wave detectors are located along a plurality of spaced apart parallel lines. A plurality of seismic wave generating stations are located along transmitting lines perpendicular to the parallel lines and offset from the longitudinal axis of the parallel lines at one end thereof. Seismic waves are produced from the generating stations and reflections therefrom are received at the detectors to provide three-dimensional common depth point coverage.

In accordance with another aspect of the invention, a plurality of seismic wave detectors are located along a plurality of spaced apart first parallel lines to form two spaced apart line groups. A plurality of seismic wave transmitting stations are located along a plurality of transmitting lines substantially perpendicular to the first parallel lines and disposed between the two line groups.

For a more complete understanding of the present invention and for further objects and advantages thereof, reference is now made to the following description taken in conjunction with the accompanying drawings, in which.

Figure 1:
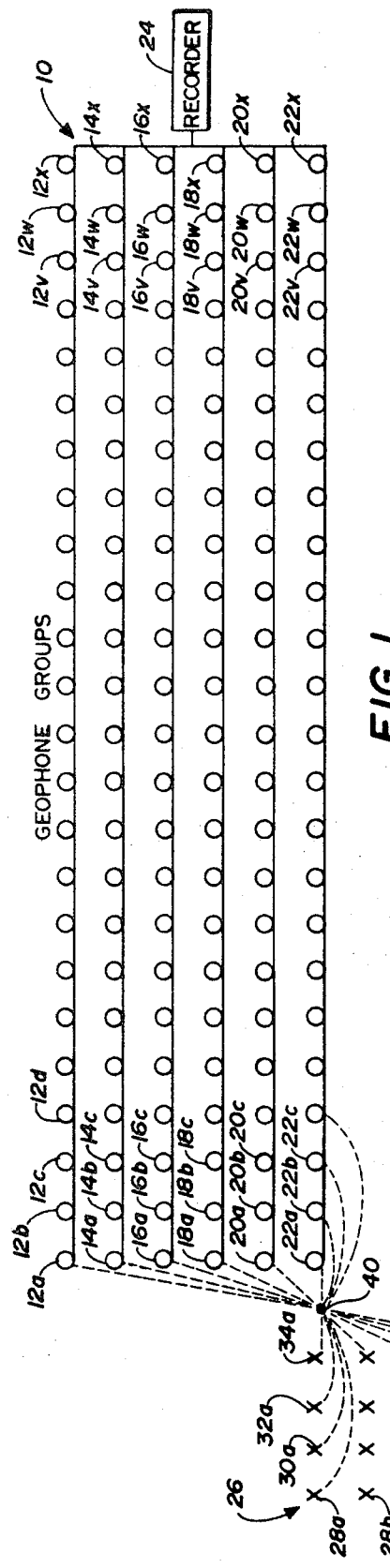
FIG. 1 is a diagrammatic top view of a typical wave generator and geophone placement according to the invention.

Referring to FIG. 1, the locations of seismic wave generating stations are indicated by X and the locations of seismic geophones are indicated by O. An array of geophones or detectors is designated by the numeral 10 and includes a plurality of geophone or detector groups disposed along parallel spaced apart lines. For instance, 24 geophone groups $12a-x$ are disposed along a line parallel to the line defined by 24 geophone groups $14a-x$. Four additional parallel lines are defined by the geophone groups $16a-x$, $18a-x$, $20a-x$ and $22a-x$. Numerical identification of certain of the geophones has been omitted for clarity of illustration. Each of the geophone groups are connected along a conventional seismic cable, the outputs of which are connected to a conventional magnetic recorder 24.

The geophones shown in FIG. 1 may comprise any conventional type well known in the art. Each of the geophone locations may comprise a single geophone, or alternatively, may comprise several spaced apart geophones making up a geophone pattern. While six parallel lines each comprising 24 geophones have been illustrated, it will be understood that different numbers of geophones and parallel lines may be alternatively used with the invention. For example, three parallel lines each including 12 geophones may alternatively be utilized when less reflection redundancy is required.

A plurality of lines of seismic wave generating stations are offset from the longitudinal axis of the geophone groups at the location generally indicated by the numeral 26. For instance, a transmitting line of seismic wave generating stations is defined by stations 28a–f, with subsequent parallel transmitting lines of seismic wave generating stations being defined by stations 30a–f, 32a–f and 34a–f. An important aspect of the invention is the fact that the lines of seismic wave generating stations are generally perpendicular to the lines of geophones.

In the preferred embodiment of the invention, the seismic wave generating stations 28a, 30a, 32a and 34a are aligned with the line of geophones 22a–x. Further, in the preferred embodiment of the invention, the spacing between the seismic wave generating stations 28a and 28b is generally equal to the spacing between the lines of geophones 20a–x and 22a–x. While in the preferred embodiment of the invention, the number of seismic wave generating stations in each transmitting line is equal to the number of parallel rows of geophones, it will be understood that the number of generating stations along each transmitting line could be varied for various desired operating characteristics.

The seismic wave generators used at the generating stations according to the invention may comprise any suitable conventional type of seismic disturbance generator. For instance, conventional dynamite shot detonation may be utilized at each of the illustrated generator locations. Alternatively, conventional truck-mounted vibrating, gas exploder, or weight dropping apparatus may be utilized and moved from station to station. It should also be understood that a small array of seismic generators could be placed in each position indicated by X in the drawings.

In operation of the prospecting system shown in FIG. 1, seismic waves are sequentially generated from each of the stations 28a–f. The generating stations 28a–f can be individually operated in any order with suitable control circuitry. The generating stations 28a–f can also be simultaneously operated, although optimum results are obtained with sequential operation. Reflections from these seismic waves are received by each of the geophone arrays 10. The resulting electrical output signals from these geophones are recorded upon a multitrace recorder 24 in the well known manner. Several recorders 24 may be connected in parallel if desired. Next, seismic waves are sequentially generated from each of the generating stations 30a–f in any desired order, and reflections therefrom also received at each of the geophones and recorded upon the recorder 24. Similarly, sequential generation of seismic waves in any desired order are initiated from the generating stations 32a–f, and then from the generating stations 34a–f.

Figure 2:
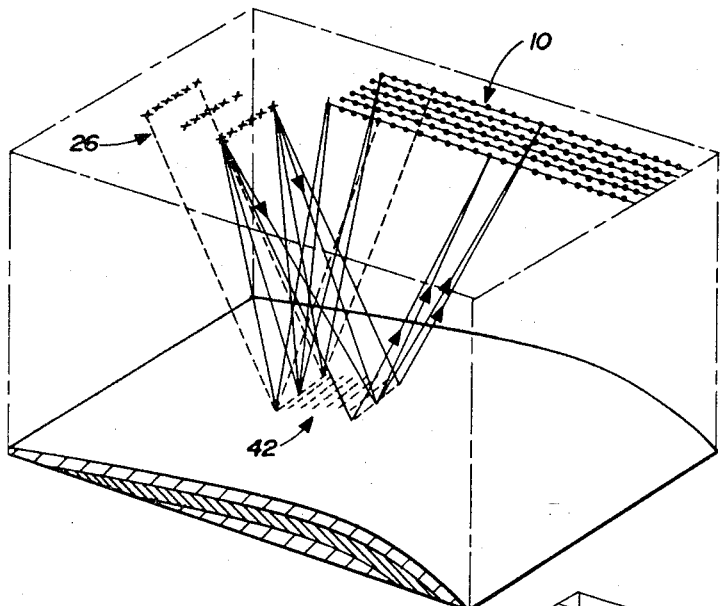
FIGS. 2 and 3 are three-dimensional diagrams illustrating the three-dimensional and common depth point coverage aspects of exploration according to the invention.

This sequential seismic disturbance generation enables a continuous subsurface area to be explored. This is clearly illustrated in FIG. 2, where it may be seen that sequential generation of seismic waves from one transmitting line at a time enables a subsurface area 42 to be covered according to the three-dimensional common depth point manner of the invention.

This initiation of seismic waves from the generators along sequential ones of the transmitting lines causes multi-fold coverage of a subsurface area in a three-dimensional manner. For example, consider in FIG. 1, the subsurface point schematically illustrated by the numeral 40. Point 40 acts as a reflecting point for seismic waves generated from each of the seismic wave generating stations 28a–f, 30a–f, 32a–f and 34a–f. For example, seismic waves generated from the station 34a are reflected from the point 40 and are received by the geophone 22a, as indicated by the dotted line raypath. Similarly, seismic waves generated from the station 32a are reflected from point 40 and received by the geophone 22b. The seismic waves thus reflected from point 40 provide common depth point coverage in a vertical plane parallel to the lines of geophones. Further, seismic waves from the station 34b are reflected from the point 40 and are received by the geophone 20a. Similarly, seismic waves generated from the station 34f follow the dotted line raypath and are reflected from point 40 and received by the geophone 12a. Thus, the invention also provides common depth point coverage in a vertical plane generally perpendicular to the parallel lines of geophones. Redundant three-dimensional common depth point coverage is provided by the invention at the subsurface point 40.

Figure 3:
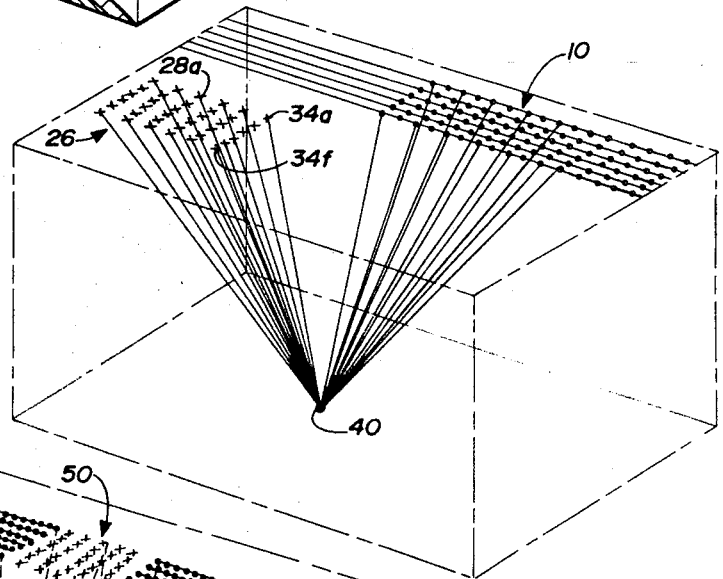

FIG. 3 illustrates raypaths from six sequential seismic disturbance lines which converge at the common depth point 40, whereupon they are reflected to respective ones of the geophone array 10. Specifically, common depth point coverage in a vertical plane parallel to the geophone lines is illustrated by the raypaths of seismic waves generated from the stations 28a and 34a. Common depth point coverage in a vertical plane perpendicular to the geophone lines is illustrated by the seismic waves emitted from the stations 34a and 34f. As illustrated in FIG. 3, the number of transmitting lines of the invention is not limited to the four shown in FIG. 1. In practice, the geophones in the array 10 are sequentially moved along their parallel lines of traverse by the conventional "roll along" technique, with additional transmitting lines being defined in the offset position following the geophone array.

Figure 4:
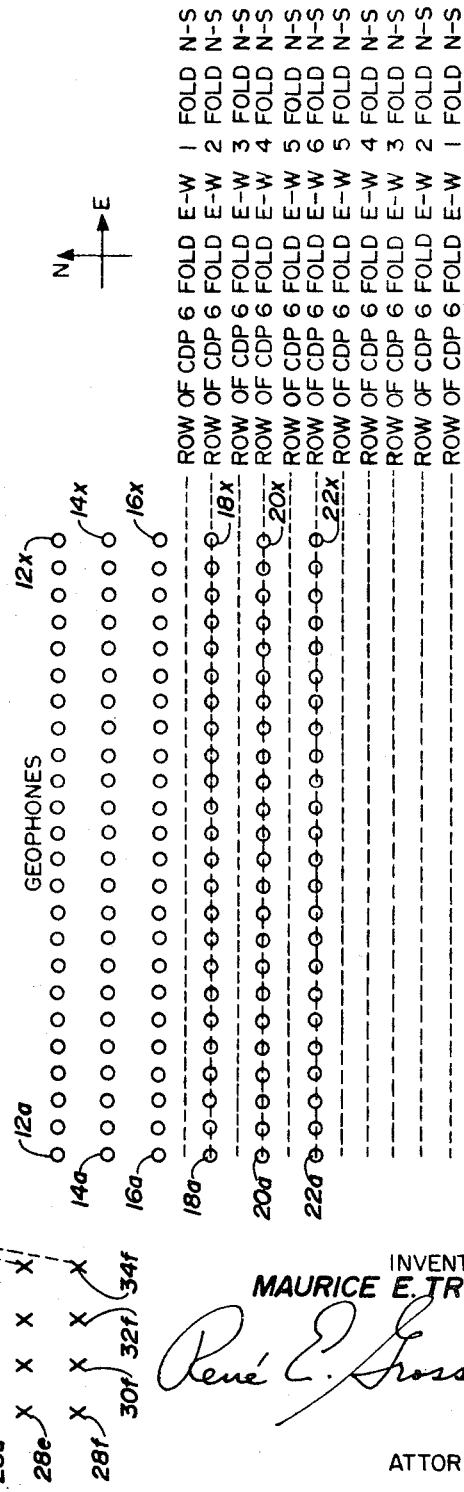
FIG. 4 is a diagram of the geophone placement generally shown in FIG. 1 and including legends indicating the multi-fold coverage provided thereby.

FIG. 4 further illustrates the advantageous multi-fold coverage of the invention. The geophone array of FIG. 1 is represented and includes six parallel lines of 24 geophones each. After the initiation of the required number of sequential lines of seismic disturbances in the manner previously described, eleven rows of common depth point three-dimensional coverage will be provided as illustrated in FIG. 4 by dotted lines. Assuming that the transmitting lines are parallel to north, while the geophone lines are parallel to the east, the present technique provides eleven rows of common depth point six-fold coverage in the east-west direction. Further, the present technique provides varying multi-fold coverage in the north-south direction, with six-fold north-south coverage being provided along the central line which is parallel to geophones 22a–x.

After recording the desired number of traces according to the invention with the recorder 24, the recorded data is usually transported to a playback and processing unit and the processed output signals are recorded upon a playback recorder for data interpretation. As an example, the Digital Field System DFS/10,000 manufactured and sold by Texas Instruments Incorporated, the present assignee, may advantageously be utilized to digitally record and process the seismic traces. Other processing may then be conducted on the seismic data in a conventional, properly programmed digital computer, such as the TIAC computer manufactured and sold by Texas Instruments Incorporated. Due to the high redundancy data provided by the present invention, greatly improved signal-to-noise ratios may be provided by conventional digital processing. Such processing includes any of the well known methods such as compositing, mixing, coherence filtering, diversity stacking, velocity filtering and the like.

Figure 5:
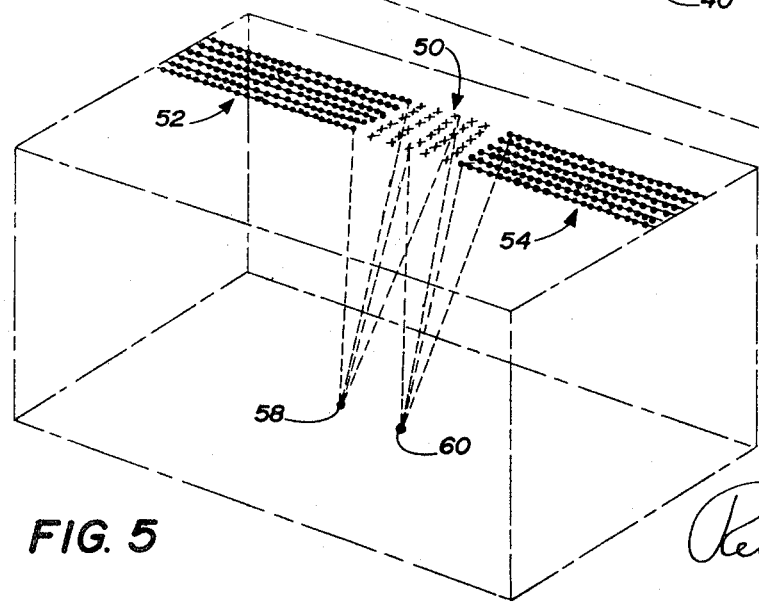
FIG. 5 is a three-dimensional diagram illustrating seismic exploration according to a second embodiment of the invention.

FIG. 5 illustrates another embodiment of a prospective technique according to the invention. In this embodiment, the seismic wave generating stations are aligned between the ends of two spaced apart geophone arrays. This technique is termed gapped split, three-dimensional common depth point operation. A plurality of parallel transmitting lines designated generally by the numeral 50 are defined by seismic wave source stations. In the illustrated embodiment, five transmitting lines of six source stations each are shown. A first group of geophones 52 is arranged in spaced apart parallel lines which are perpendicular to the transmitting lines 50. A second group of geophones 54 is also laid out in parallel lines which are perpendicular to the transmitting lines 50. In the preferred embodiment, the number of seismic wave generating stations along each transmitting line is equal to the number of spaced apart parallel lines of geophones. However, more or less seismic wave generating stations could be used along each transmitting line if desired.

In operation of the invention, seismic waves are sequentially generated along a single transmitting line and the waves are received by the geophones in both the first and second arrays 52 and 54. The next adjacent one of the transmitting lines is then sequentially initiated to generate additional seismic waves which are also received and recorded in the above-described manner. As shown in FIG. 5, this technique provides common depth point coverage in three dimensions. For example, three-dimensional coverage is illustrated by the dotted raypaths with respect to subsurface points 58 and 60. The remaining common depth points provided by the technique shown in FIG. 5 have been omitted from the drawings for simplicity of illustration.

With the use of the present invention, a significant increase in signal-to-noise ratio may be achieved with respect to conventional seismic prospecting, with an increase as much as 16db being attainable. The present invention provides extremely advantageous capability for static correction estimation due to the redundancy of data provided. Diversity stacking in areas with locally severe near surface problems is available for use with the invention. The present invention provides reduction of "offside" noise, and the problem of alias points on in-line, depth point noise rejection may be overcome by the invention by the correct spacing apart of the lines of traverse.

The present invention provides advantageous three-dimensional coverage, wherein the true depth of a subsurface area may be accurately determined. Detailed migration is available with the use of the invention, as are accurate velocity determinations. Organized noise can be advantageously rejected in processing of data obtained by the present invention.

Whereas the present invention has been described with respect to specific embodiments thereof, it should be understood that various changes and modifications will be suggested to one skilled in the art, and it is intended to encompass those changes and modifications as fall within the scope of the appended claims.

What is claimed is:

1. The method of seismic exploration comprising:
   a. locating a plurality of seismic wave detectors along a plurality of spaced apart first parallel lines,
   b. locating a plurality of seismic wave transmitting stations along each of a plurality of second parallel lines substantially perpendicular to said first parallel lines, said second lines being aligned at the end of said first lines, and
   c. initiating seismic waves from each transmitting station in a sequence, said seismic waves being received by said detectors to provide three-dimensional common depth point coverage.

2. The method of claim 1 wherein the number of seismic wave transmitting stations along each of said second lines is equal to the number of said first lines.

3. The method of seismic exploration comprising:
   a. locating a plurality of seismic wave detectors along a plurality of spaced apart parallel lines,
   b. generating in a sequence multifrequency seismic waves at each spaced apart transmitting location along lines substantially perpendicular to said parallel lines, the number of spaced apart transmitting locations being equal to the number of said parallel lines, and
   c. detecting said seismic waves at said detectors to provide three-dimensional common depth point coverage.

4. The method of claim 3 wherein said spaced apart transmitting locations are offset from the longitudinal axis of said parallel lines.

5. The method of claim 3 wherein said spaced apart transmitting locations are aligned with one end of said spaced apart parallel lines.

6. The method of claim 3 wherein said spaced apart transmitting locations are disposed in a mid-portion of said parallel lines and aligned with the longitudinal axis of said parallel lines.

7. The method of claim 3 wherein said transmitting locations are spaced apart by the same distance as said parallel lines.

8. The method of claim 3 wherein said seismic waves are generated from sequential ones of said lines.

9. The method of seismic exploration comprising:
   a. locating a plurality of seismic wave detectors along a plurality of spaced apart parallel lines, said parallel lines being in a horizontal plane,
   b. locating a plurality of seismic wave generating stations along transmitting lines perpendicular to said parallel lines and offset from the longitudinal axis of said parallel lines at one end thereof, and
   c. producing in sequence seismic waves from each of said generating stations and receiving said waves at said detectors to provide three-dimensional common depth point coverage.

10. The method of claim 9 wherein the number of said seismic wave generating stations in each said transmitting line is equal to the number of said parallel lines.

11. The method of claim 9 wherein said transmitting lines are parallel.

12. The method of claim 9 wherein an end seismic wave generating station in each of said transmitting lines is aligned with an outermost one of said parallel lines.

13. The method of claim 9 wherein said seismic wave generating stations are uniformly spaced apart by a distance equal to the spacing between said parallel lines.

14. The method of claim 9 wherein seismic waves are produced from one of said transmitting lines at a time.

15. A system for seismic exploration comprising:

a. a plurality of seismic detectors located along a plurality of spaced apart parallel lines, and b. means for sequentially generating multifrequency seismic waves at a plurality of locations along transmitting lines disposed adjacent one end of said parallel lines and substantially normal to said parallel lines, whereby said seismic waves are received by said detectors to provide three-dimensional common depth point coverage.

16. The system of claim 15 wherein said transmitting lines are laterally offset from said parallel lines.

17. The system of claim 15 wherein said means for generating seismic waves are aligned with said parallel lines at the end thereof.

18. The system of claim 15 wherein seismic waves are generated along sequential ones of said transmitting lines.

19. The system of claim 15 wherein said transmitting lines are disposed between the ends of two groups of seismic detectors.

20. The system of claim 19 wherein the number of said means for generating seismic waves along each said transmitting lines equals the number of said parallel lines.

21. The system of claim 19 wherein the spacing between each said means for generating seismic waves is substantially equal to the spacing between said parallel lines.

* * * * *